April 14, 1964 W. TRANKNER ETAL 3,128,684
CAMERA DATA DEVICE
Filed Dec. 28, 1959
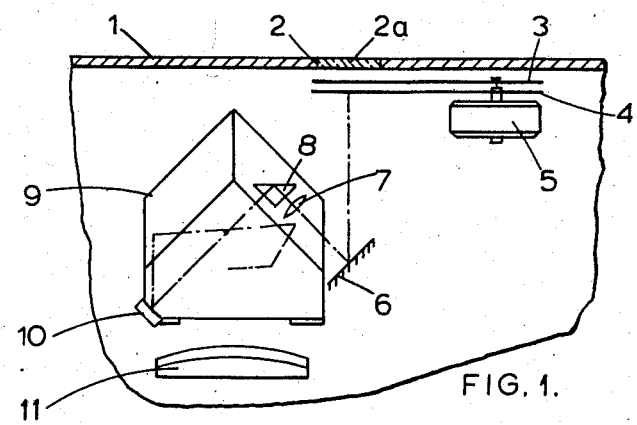
FIG. 1.
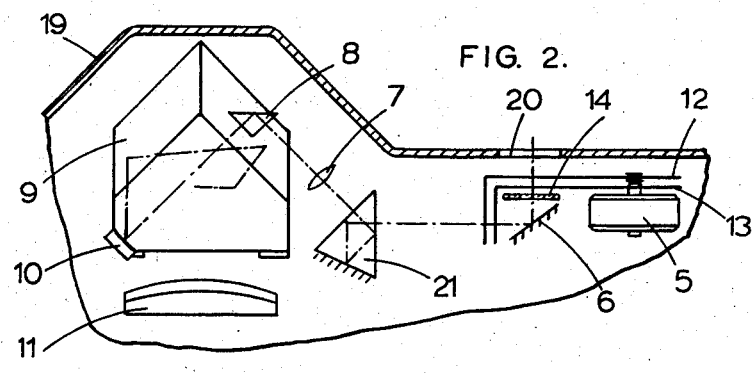
FIG. 2.
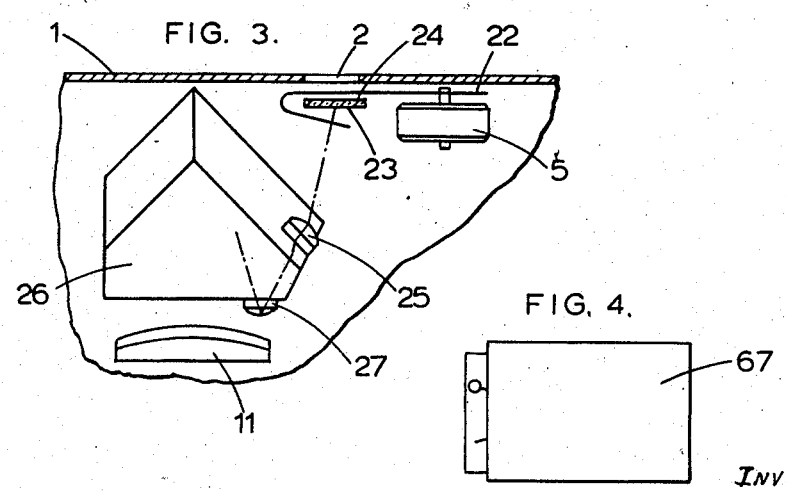
FIG. 3.
FIG. 4.
INVENTORS:
WERNER TRANKNER,
ROLF JURENZ AND
GERHARD BÖRNER.
BY: Irwin S. Thompson
ATTORNEY 3,128,684
CAMERA DATA DEVICE
Werner Trankner, Rolf Jurenz, and Gerhard Börner, all of Dresden, Germany, assignors to Veb Kamera- und Kinowerke Dresden, Dresden, Germany
Filed Dec. 28, 1959, Ser. No. 862,319
5 Claims. (Cl. 95—10)

The invention relates to a device for reflecting information affecting camera settings into the viewfinder arrangement on a monocular reflex camera.

Many proposals have been made to visibilize such information, for instance, in the form of the pointers of an electric exposure meter, in or near the viewfinder image of a photographic camera. For instance, it is known to arrange a meter pointer above or immediately below the ground-glass disc of a reflex camera and to make the diaphragm settings and shutter speeds readable on said disc. In another known construction the indicating elements of an electric exposure meter and of other means requiring adjustment in connection with exposure are disposed, for movement parallel or substantially parallel with the focusing surface, in the space between the focusing screen and the optical system for viewfinding within the range of accommodation of the viewing eye. The main disadvantages of this known arrangement are that the space above and below the ground-glass disc and inside the viewfinder cover is considerably reduced—i.e., the size of a camera fitted with such an arrangement must be increased. Also the arrangement, although requiring many extra mechanical and optical components, does not comply with the requirement, found in cameras having pentaprisms, of rendering the measurement values readable not only in or near the viewfinder but also from the top of the camera.

A more recent proposal complies with some of the requirements by using one of the reflecting pentagon surfaces, and that reflecting surface of the pentaprism which forms the viewfinder image, to focus the instrument pointer at least substantially in a plane optically associated with the viewfinder focusing screen.

A disadvantage of this arrangement is that the measurement image introduced by reflection appears with the viewfinder image and enables only one mean setting of the indicating member to be observed. Consequently the arrangement is satisfactory for zero shot focusing but not for focusing involving a follow-up pointer, the latter kind of focusing having, of course, a number of advantages over the former. With this arrangement it is quite impossible to have a view of scales of diaphragm settings or exposure speeds.

According to the invention, to obviate these disadvantages and provide further advantages, one of those surfaces of the pentaprism which are not concerned in the formation of the viewfinder image remains devoid of lacquer or other coverings in order that scales, pointers, marks or the like or images thereof may be observed. The scales, pointers, marks or the like can be provided, or have images formed of themselves, on or near any of the surfaces, except the base surface of the pentaprism. According to another feature of the invention, in a reflex camera information affecting focusing is reflected into the path of the viewfinder rays by means for forming an intermediate image, the information forming near the eye an image of the entry pupil of said means through the agency of a collecting system (collecting lens and/or collecting mirror) which is either combined into a unit with the pentaprism of a monocular reflex camera or is formed by the pentaprism itself.

According to a further development of the invention, an asymmetrical collecting system is used or the collecting system is associated with an asymmetrical wedge to provide suitable directing of the light rays which it is required to reflect into the path of the viewfinder rays.

Several constructional forms of the invention will hereinafter be described in greater detail with reference to examples from which other features of the invention will be apparent. Details not directly connected with the invention have been omitted. In the drawings:

FIGURES 1 and 2 are partly sectioned views through a viewfinder cover, focusing means being provided above one of the inclined surfaces and a facet formed as a concave mirror or cylindrical mirror being provided on the pentaprism;

FIGURE 3 illustrates a widened prism comprising a collecting mirror on the lower part of the pentaprism surface near the image-receiving means; and FIGURE 4 illustrates the image seen by the viewer.

In the embodiments illustrated in FIGURES 1 and 2, there is an interruption in the boundary edge between a surface parallel with the viewing direction and the base surface of a pentaprism 9 which is near a collecting lens 11, a concave mirror 10 being provided on the resultant facet.

In the example shown in FIGURE 1, light enters through an aperture 2 in a cover 1 and is incident upon a follow-up pointer 3 and an operative pointer 4 of an exposure meter, 5. A mirror 6 reflects the light to a collecting lens 7 which, by way of a reflecting prism 8, forms an image on the concave mirror 10 of the pointers 3, 4 which have a light background behind them. The light from the prism 8 passes through an air gap between the prism 8 and the inclined surface of the pentaprism 9 and enters the same. The effect of the air gap between the prisms 8, 9 is that light rays emanating from the viewfinder image through the base surface are totally reflected by the inclined surface. Consequently an image is formed near the viewer's eye, as it is looking into the monocular eyepiece (not shown), of the entry pupil of the collecting lens 7, with the result that the whole range of adjustment of the pointers 3, 4 can be seen in uniform brightness. The pointers 3, 4 can be seen both from the top of the cover 1, through the aperture 2 therein, and through the viewfinder eyepiece, due to the light entering through the aperture 2. Conveniently, to improve the background for viewing, a cover disc 2a, which is partly ground and, for viewing from the exterior, partly transparent, is provided for the aperture 2.

FIGURE 2 illustrates an arrangement wherein a cover 19 is raised above the pentaprism 9 and is formed with an aperture 20 for incident light and viewing. The prism 9, concave mirror 10, converging lens 11, meter mechanism 5, mirror 6, converging lens 7 and reflecting prism 8 are taken over from FIGURE 1, while the follow-up pointer 12, operative pointer 13 and ground-glass screen 14 are taken over from FIGURE 2. A triple-reflecting prism 21 placed between the pointers 12, 13 and the converging lens 7 deflects the light parallel with the inclined surface of the prism 9, the light passing through the last-mentioned surface into the prism 9 after passing through the reflecting prism 8. As previously described with reference to FIGURE 1, the pointers can be viewed either through the viewfinder eyepiece or from the top of the cover 19 through the aperture 20 therein.

The example illustrated in FIGURE 3 uses the cover 1 formed with the aperture 2, the meter 5 and the converging lens 11. Novel features as compared with the embodiments hereinbefore described are: a ground-glass screen 23 having a fixed adjusting mark 24 on its ground surface; a meter pointer 22 bent around the screen 23; a converging lens 25; a widened pentaprism 26; and a concave reflecting strip 27. An image of the bent end of the pointer 22 and of the mark 24 is formed by the converging lens 25 on the concave reflecting strip 27 and, as already described, seen through the eyepiece.

FIGURE 4 illustrates the ground-glass screen image 67 presented to the viewer, the exposure setting information being shown adjacent the image 67.

We claim:

1. A photographic monocular reflex camera having, in combination:
   (a) a housing;
   (b) a viewfinder roof-edge prism mounted within the housing, having a first light transmitting surface through which the light rays from the object to be photographed enter the prism, a second light transmitting surface through which the light rays reflected within the prism pass along the line of sight of the observer, and a third light transmitting surface;
   (c) exposure condition indicating means arranged in the housing;
   (d) an image field lens located within said housing adjacent the first light transmitting surface;
   (e) a reflecting surface provided on said prism for reflecting an image of said indicating means into the light path of the viewfinder prism;
   (f) a light aperture in said housing adjacent said indicating means; and
   (g) a converging lens located between said indicating means and said third light transmitting surface, but not contacting the latter, for transmitting an image of said indicating means into the line of sight of the observer by way of said third light transmitting surface and said reflecting surface.

2. A photographic monocular reflex camera having, in combination:
   (a) a housing;
   (b) a viewfinder roof-edge prism mounted within the housing, having a first light transmitting surface through which the light rays from the object to be photographed enter the prism, a second light transmitting surface through which the light rays reflected within the prism pass along the line of sight of the observer, and a third light transmitting surface;
   (c) exposure condition indicating means arranged in the housing;
   (d) an image field lens located within said housing adjacent the first light transmitting surface;
   (e) a first reflecting surface provided on said prism, at the juncture of the base and one side wall of said roof-edge prism, in addition to the normal object image reflecting surfaces of said prism;
   (f) a second reflecting surface provided in said housing adjacent and inclined to said third light transmitting surface;
   (g) a light aperture in said housing adjacent said indicating means; and
   (h) a converging lens located between said indicating means and said second light reflecting surface for transmitting an image of said indicating means into the line of sight of the observer by way of said second light reflecting surface, said third light transmitting surface and said first reflecting surface.

3. A photographic monocular reflex camera having, in combination:
   (a) a housing;
   (b) a viewfinder roof-edge prism mounted within the housing, having a first light transmitting surface through which the light rays from the object to be photographed enter the prism, a second light transmitting surface through which the light rays reflected within the prism pass along the line of sight of the observer, and a third light transmitting surface;
   (c) exposure condition indicating means arranged in the housing;
   (d) an image field lens located within said housing adjacent the first light transmitting surface;
   (e) a reflecting surface provided on said prism, at the juncture of the base and one side wall of said roof-edge prism, in addition to the normal object image reflecting surfaces of said prism;
   (f) a further prism provided in said housing adjacent said third light transmitting surface and spaced apart therefrom so as to provide an air gap between said prism and the third light transmitting surface, said further prism effecting reflection of an image of the indicating means;
   (g) a light aperture in said housing adjacent said indicating means; and
   (h) a converging lens located between said indicating means and said further prism for transmitting an image of said indicating means into the line of sight of the observer by way of said further prism, said third light transmitting surface and said reflecting surface.

4. A photographic monocular reflex camera having, in combination:
   (a) a housing;
   (b) a viewfinder roof-edge prism mounted within the housing, having a first light transmitting surface through which the light rays from the object to be photographed enter the prism, a second light transmitting surface through which the light rays reflected within the prism pass along the line of sight of the observer, and a third light transmitting surface;
   (c) exposure condition indicating means arranged in the housing;
   (d) an image field lens located within said housing adjacent the first light transmitting surface;
   (e) a first reflecting surface provided on said prism, at the juncture of the base and one side wall of said roof-edge prism, in addition to the normal object image reflecting surfaces of said prism;
   (f) a further prism provided in said housing adjacent said third light transmitting surface and spaced apart therefrom so as to provide an air gap;
   (g) a light aperture in said housing adjacent said indicating means;
   (h) a second reflecting surface provided adjacent said indicating means; and
   (i) a converging lens located between said second reflecting surface and said prism for transmitting an image of said indicating means, received from the second reflecting surface, into the line of sight of the observer by way of said third light transmitting surface and said first reflecting surface.

5. A photographic monocular reflex camera having, in combination:
   (a) a housing;
   (b) a viewfinder roof-edge prism mounted within the housing, having a first light transmitting surface through which the light rays from the object to be photographed enter the prism, a second light transmitting surface through which the light rays reflected within the prism pass along the line of sight of the observer, and a third light transmitting surface;
   (c) exposure condition indicating means arranged in the housing;

(d) an image field lens located within said housing adjacent the first light transmitting surface;
(e) a reflecting surface provided on said prism, at the juncture of the base and one side wall of said roof-edge prism, in addition to the normal object image reflecting surfaces of said prism;
(f) a light aperture in said housing adjacent said indicating means;
(g) a cover disc in said light aperture, which disc is partly ground and partly transparent for viewing said indicating means through said aperture from the exterior; and
(h) a converging lens located between said indicating means and said third light transmitting surface, but not contacting the latter, for transmitting an image of said indicating means into the line of sight of the observer by way of said third light transmitting surface and said reflecting surface.

References Cited in the file of this patent

UNITED STATES PATENTS

| | | |
|---|---|---|
| 2,213,942 | Riszdorfer | Sept. 3, 1940 |
| 2,358,084 | Mihalyi | Sept. 12, 1944 |
| 2,784,654 | Meyer | Mar. 12, 1957 |
| 2,933,991 | Sauer | Apr. 26, 1960 |